US012759691B2

(12) United States Patent
Jagadeesan et al.

(10) Patent No.: US 12,759,691 B2
(45) Date of Patent: Oct. 13, 2026

(54) AIRCRAFT FUSELAGE

(71) Applicants: Airbus (S.A.S.), Blagnac (FR); Airbus Operations GmbH, Hamburg (DE); Airbus Operations (S.A.S.), Toulouse (FR); Airbus Operations S.L., Getafe (ES)

(72) Inventors: Jayaparthan Jagadeesan, Bristol (GB); Adithya Nagara Venkatachala, Bristol (GB); Cristobal Federico Brito Maur, Bristol (GB); Victor Tabernero Martinez, Bristol (GB); Benoît Thomas, Bristol (GB)

(73) Assignees: Airbus (S.A.S.), Blagnac (FR); Airbus Operations GmbH, Hamburg (DE); Airbus Operations (S.A.S.), Toulouse (FR); Airbus Operations SL, Getafe (ES)

( * ) Notice: Subject to any disclaimer, the term of this patent is extended or adjusted under 35 U.S.C. 154(b) by 0 days.

(21) Appl. No.: 19/153,704

(22) PCT Filed: Feb. 5, 2024

(86) PCT No.: PCT/EP2024/052798
§ 371 (c)(1),
(2) Date: Aug. 5, 2025

(87) PCT Pub. No.: WO2024/165506
PCT Pub. Date: Aug. 15, 2024

(65) Prior Publication Data

US 2026/0233825 A1 Aug. 13, 2026

(30) Foreign Application Priority Data

Feb. 7, 2023 (IN) ............................ 202311007907

(51) Int. Cl.
*B64C 1/14* (2006.01)

(52) U.S. Cl.
CPC .......... *B64C 1/1438* (2013.01); *B64C 1/1461* (2013.01)

(58) Field of Classification Search
CPC ............................ B64C 1/1438; B64C 1/1461
See application file for complete search history.

(56) References Cited

U.S. PATENT DOCUMENTS 6,186,444 B1 * 2/2001 Steel .................... B64C 1/1438 160/214
10,543,919 B2 * 1/2020 Tremblay .................. B64C 1/10
2007/0051048 A1 * 3/2007 Krohn ................... B64C 1/1469 49/413

FOREIGN PATENT DOCUMENTS

CN 106401426 A 2/2017
CN 106167087 B 6/2021
(Continued)

OTHER PUBLICATIONS

International Search Report and Written Opinion of the International Searching Authority in International Application No. PCT/EP2024/052798 mailed Apr. 17, 2024, 12 pages.

*Primary Examiner* — Kimberly S Berona
*Assistant Examiner* — Steven J Shur
(74) *Attorney, Agent, or Firm* — KDW Firm PLLC

(57) ABSTRACT

An aircraft fuselage includes fore and aft sections of the aircraft fuselage, a barrier wall separating the fore and aft sections, the barrier wall defining an opening, a door moveable in a straight line across the barrier wall that defines a direction of movement between an open position in which the door is offset from the opening and a closed position in which the door covers the opening, a seal assembly including a first member attached to the barrier wall and extending around a perimeter of the opening, and a second member
(Continued)

attached to the door and configured to engage with the first member at respective seal surfaces to form a seal around the perimeter of the opening.

20 Claims, 12 Drawing Sheets

(56) References Cited

FOREIGN PATENT DOCUMENTS

| | | | |
|---|---|---|---|
| DE | 3917206 | C1 | 5/1990 |
| JP | 2006088969 | A | 4/2006 |
| JP | 7064358 | B2 | 4/2022 |

* cited by examiner

AIRCRAFT FUSELAGE

This application is a national stage filing under 35 U.S.C. 371 of pending International Application No. PCT/EP2024/052798, filed Feb. 5, 2024, which claims priority to IN Patent Application No. 202311007907, filed Feb. 7, 2023, the entireties of which applications are incorporated by reference herein.

FIELD OF THE INVENTION

The present invention relates to an aircraft fuselage, and an aircraft comprising the aircraft fuselage.

BACKGROUND OF THE INVENTION

A barrier wall may be provided adjacent to the cargo section of a freighter aircraft, the barrier wall intended to arrest forward movement of any cargo containers in the event of an emergency landing or other event. A door provides access through the barrier wall, with the door arranged to provide a tight, smoke-proof seal across the threshold whilst occupying minimal space in the cargo section. The door is thereby arranged to move laterally through the barrier wall between open and closed positions.

Sealing on lateral sliding doors can be achieved by either using lip/brush seals, which continuously brush against the sealing surface, or by moving the sliding door in the longitudinal direction to compress a seal. Movement of the door in the longitudinal direction is typically achieved with the help of non-linear guide tracks, such as S-shaped rails and curved end rails.

Generally, lip/brush seals are not compatible where a complete airtight and watertight seal is desired through the threshold of the door. Whilst the use of S-shaped rails, and the like, introduces additional complexities due to the use of bespoke guide rail tracks and rotatable rollers, and also increases the space envelope required for the door to operate.

SUMMARY OF THE INVENTION

A first aspect of the invention provides an aircraft fuselage comprising: fore and aft sections of the aircraft fuselage, a barrier wall separating the fore and aft sections and the barrier wall defining an opening therebetween; a door moveable in a straight line across the barrier wall between an open position in which the door is offset from the opening and a closed position in which the door covers the opening; a seal assembly comprising a first member attached to the barrier wall and extending around a perimeter of the opening, and a second member attached to the door and configured to engage with the first member at respective seal surfaces to form a seal around the perimeter of the opening; and wherein one of the first and second members comprises a seal element configured to compress at a tapered edge of the other of the first and second seal members as the door moves from the open position to the closed position.

The seal assembly allows simple linear movement to seal the door to the barrier wall, achieving an airtight and watertight seal across the periphery of the sliding door, whilst minimising the longitudinal space of the fuselage required. This provides a robust and tight seal achieved with a simple design to which control of the seal compression is easier to control. Meanwhile, the tapered edge provides a ramp onto which the seal element can be more gradually compressed so as to reduce the force required, as well as wear and tear.

The concept is scalable, easy to install/uninstall, with a seal assembly that is easier to replace.

In the open position, the first member may be separated from the second member. This total separation of the first and second members means that the front edge of the seal element has to directly impact the edge of the opposing member such that, in such an arrangement, the tapered edge has maximum effect.

The tapered edge may extend across the entire vertical extent of the seal surfaces.

The tapered edge may be located on an outer edge of the said other of the first and second seal members.

The tapered edge may be a first tapered edge. The said other of the first and second seal members may comprise a second tapered edge located on an inner edge of said other of the first and second seal members, the seal element configured to compress at the second tapered edge as the door moves from the open position to the closed position.

The first and/or second tapered edge may have a planar tapered surface configured to engage with the seal element.

The first and/or second tapered edge may have a taper angle of less than 60 degrees, and preferably less than 45 degrees.

A second aspect of the invention provides an aircraft fuselage comprising: fore and aft sections of the aircraft fuselage, a barrier wall separating the fore and aft sections, the barrier wall defining an opening; a door moveable in a straight line across the barrier wall that aligns with a direction of movement of the door between an open position in which the door is offset from the opening and a closed position in which the door covers the opening; a seal assembly comprising a first member attached to the barrier wall and extending around a perimeter of the opening, and a second member attached to the door and configured to engage with the first member at respective seal surfaces to form a seal around the perimeter of the opening; and wherein at least a portion of the seal surfaces of the first and second members are angled at an oblique angle relative to a width of the seal surfaces, the width aligned with the direction of movement of the door.

As in the first aspect, the seal assembly allows simple linear movement to seal the door to the barrier wall, achieving an airtight and watertight seal across the periphery of the sliding door, whilst minimising the required longitudinal space of the fuselage. This provides a robust and tight seal achieved with a simple design to which control of the seal compression is easier to control. Meanwhile, the oblique angle of the seal surfaces allows frictional contact between the seal surfaces to be avoided for a greater extent of the travel of the door between the open and closed positions.

The concept is scalable, easy to install/uninstall, with a seal assembly that is easier to replace and less complex than alternatives.

Said portion of the seal surfaces may extend across at least 50% of the width of the respective seal surfaces.

Said portion of the seal surfaces may extend across the entire width of the seal surface.

Said portion of each seal surface may comprise at least two seal surface regions across a width of each seal surface, the seal surface regions of each seal surface angled at a different oblique angle.

Said portion of each seal surface may comprise first, second and third seal surface regions. The second seal surface region of each seal surface may be positioned between the first and third seal surface regions.

The first and third seal surface regions may be uninterrupted across a vertical extent of the seal surfaces. The second seal surface region may be interrupted across an opening of each seal surface.

The oblique angle of the first and third seal surface regions may be at a greater angle than the oblique angle of the second seal surface region.

Said at least a portion of the seal surfaces may be angled at an oblique angle across the entire vertical extent of the seal surfaces.

The second member may comprise the seal element.

The seal element may be an elastomeric material.

The seal element may be a p-seal or o-seal.

The aircraft fuselage may comprise a linear rail along which the door is arranged to move between the open position and the closed position.

The door may be located on an aft side of the barrier wall.

The aft section of the fuselage may be a cargo area comprising one or more containers.

The barrier wall may be attached to a fuselage frame.

A further aspect of the invention provides an aircraft comprising the aircraft fuselage of the first or second aspects.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
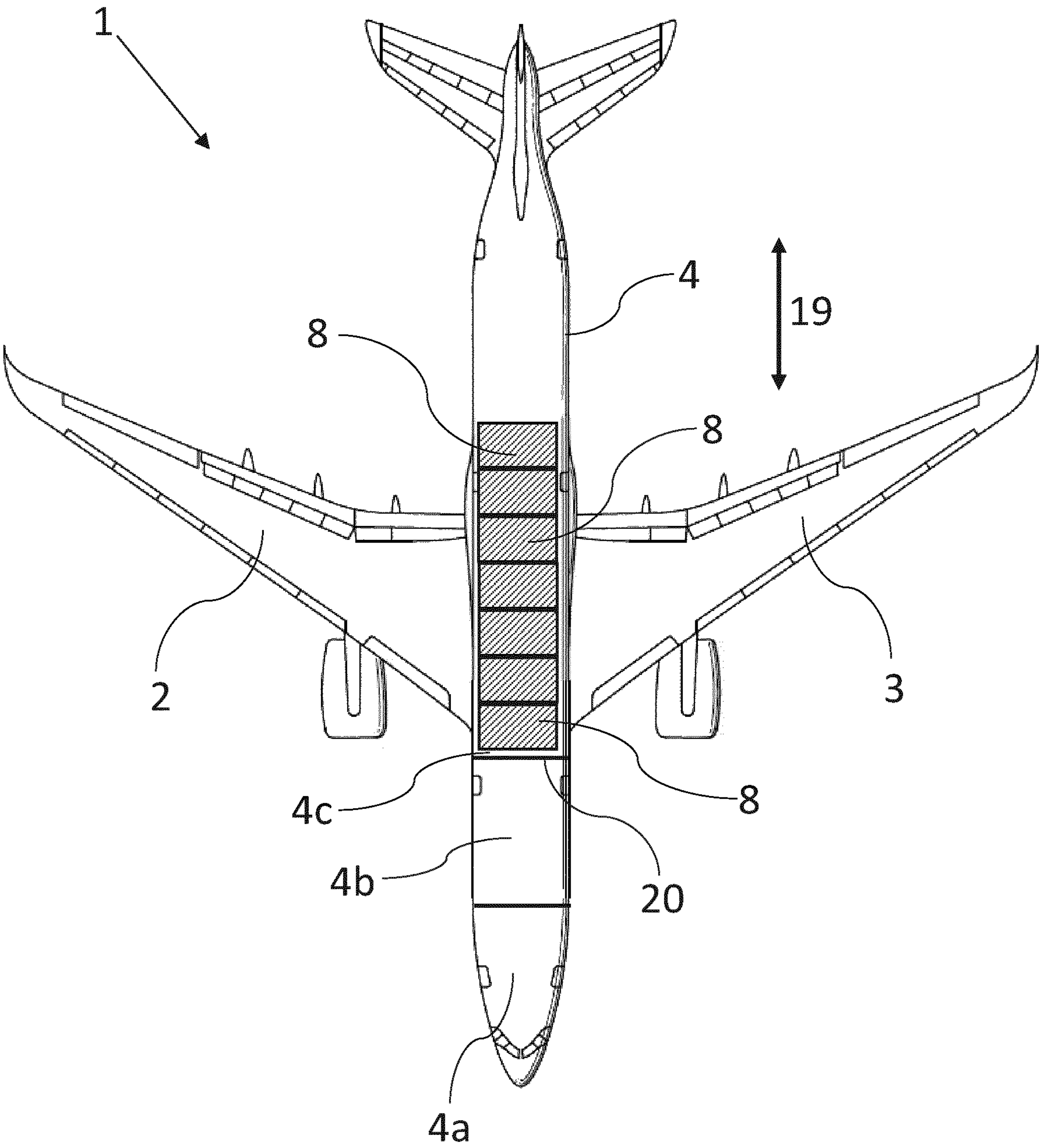
FIG. 1 shows an aircraft.

FIG. 1 shows an aircraft 1 with port and starboard wings 2, 3. Each wing 2, 3 has a cantilevered structure with a length extending in a generally spanwise direction from a root to a tip, the root being joined to an aircraft fuselage 4.

The fuselage 4 has a longitudinal axis 19 that extends in a fore-aft direction. The fuselage 4 defines two or more sections 4*a*, 4*b*, 4*c* along the longitudinal axis 19. The example shown in FIG. 1 includes a cockpit section 4*a*, a courier section 4*b* and a cargo section 4*c*. The cargo section 4*c* is separated from the cockpit and courier sections 4*a*, 4*b* by a barrier wall 20 (also referred to as a rigid cargo barrier-RCB), with the cargo section 4*a* including one or more cargo containers 8. The barrier wall 20 is a structural wall arranged to prevent movement of the cargo containers 8 forward of the barrier wall 20 in the event of an emergency landing or other in-service event that accelerates the cargo containers 8 forward. The barrier wall 20 may be formed of metal or other suitable material such as carbon fibre reinforced polymer (CFRP).

Figure 2:
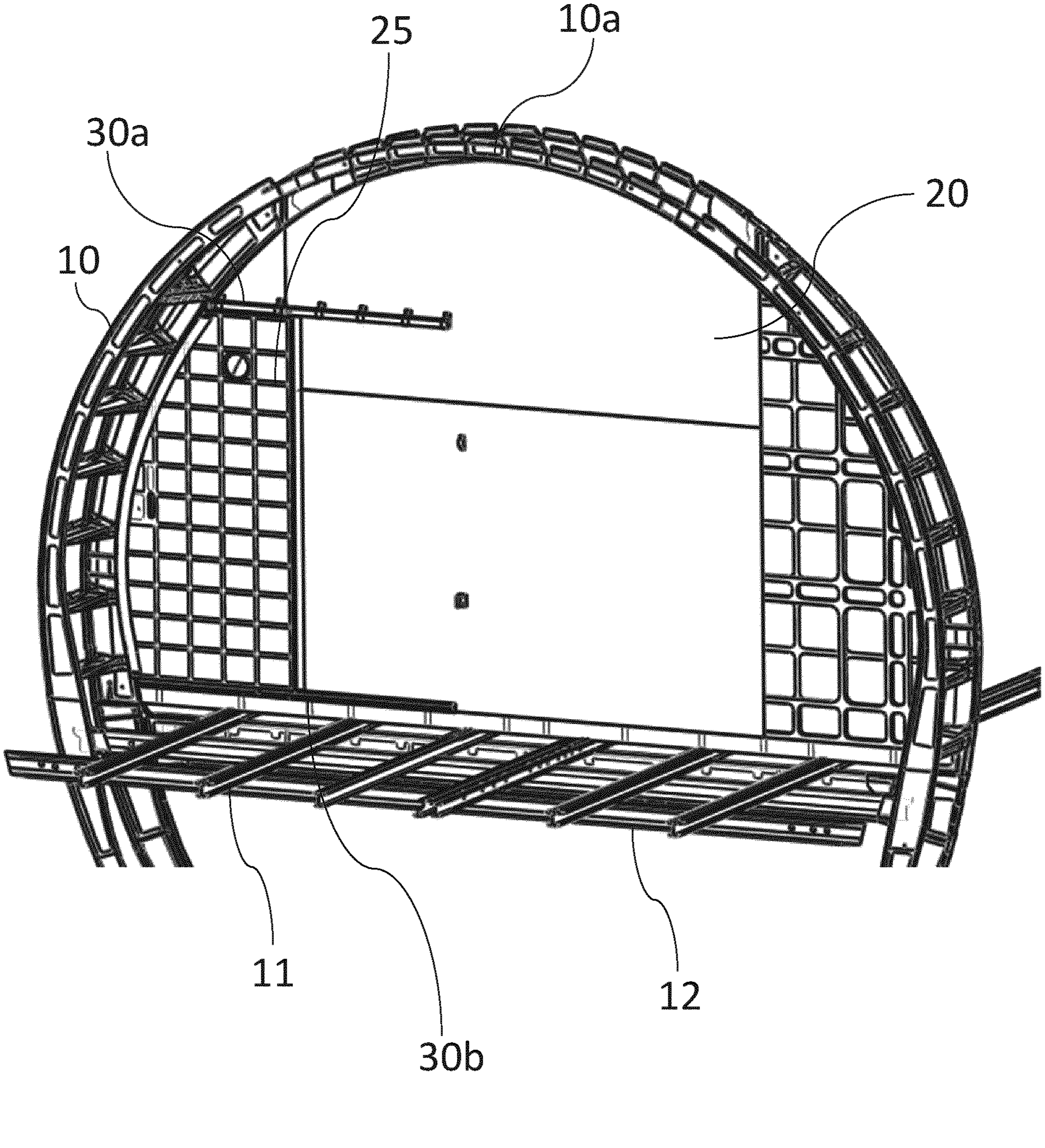
FIG. 2 shows a barrier wall attached to a fuselage frame of the aircraft.

FIG. 2 shows an example of a barrier wall 20. The barrier wall 20 is attached to the aircraft structure by a fuselage frame 10. The fuselage frame 10 is a transverse member lying in a plane normal to the longitudinal axis 19 of the fuselage 4 and arranged to support the aircraft skin (not shown) to define a cross-section of the fuselage 4. The fuselage 4 may include a plurality of fuselage frames 10 spaced along the longitudinal axis 19 of the fuselage 4. The fuselage frames 10 may be formed of metal or other suitable material.

The barrier wall 20 extends across an upper portion of the fuselage frame 10. In particular, the barrier wall 20 extends from a floor level (indicated generally by longitudinal and transverse beams 11, 12) to an upper-most inner edge 10*a* of the fuselage frame 10, although it will be appreciated that the barrier wall 20 may extend across any suitable portion of the fuselage frame 10.

The barrier wall 20 defines an opening 21 (See FIG. 3), in particular an opening 21 between the courier section 4*b* and the cargo section 4*c*. A door 25 is attached to the barrier wall 20 via upper and lower linear rails 30*a*, 30*b*, with the door 25 moveable on the linear rails 30*a*, 30*b*. The door 25 moves in a straight line across the barrier wall 20 between an open position in which the door 25 is offset from the opening 21 and a closed position in which the door 25 covers the opening 21.

The door 25 is arranged to seal the opening 21 in the closed position so as to prevent the spread of smoke through the opening 21 in the event of a fire in the cargo section 4*c*. To assist in this, the door 25 is located on an aft side of the barrier wall 20 so that a positive pressure in the cargo section 4*c* pushes the door 25 against the barrier wall 20.

Figure 3:
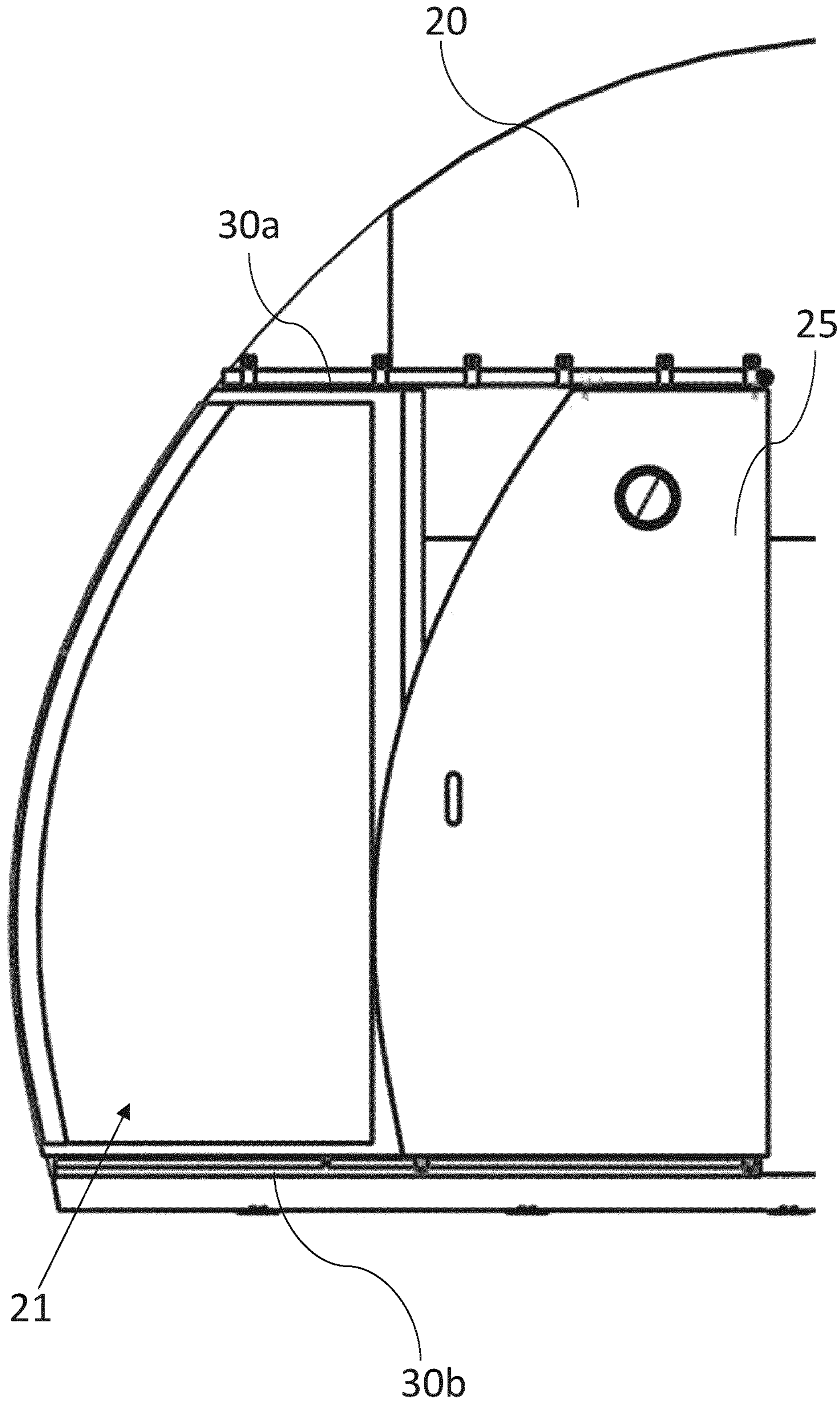
FIG. 3 shows a door adjacent the barrier wall in an open position.

FIG. 3 shows the door 25 in an open position in which the door 25 is offset from the opening 21. The door 25 is preferably entirely offset from the opening when viewed in a plane normal to the longitudinal axis 19 of the fuselage 4, although it may be partially offset in some examples.

Figure 4:
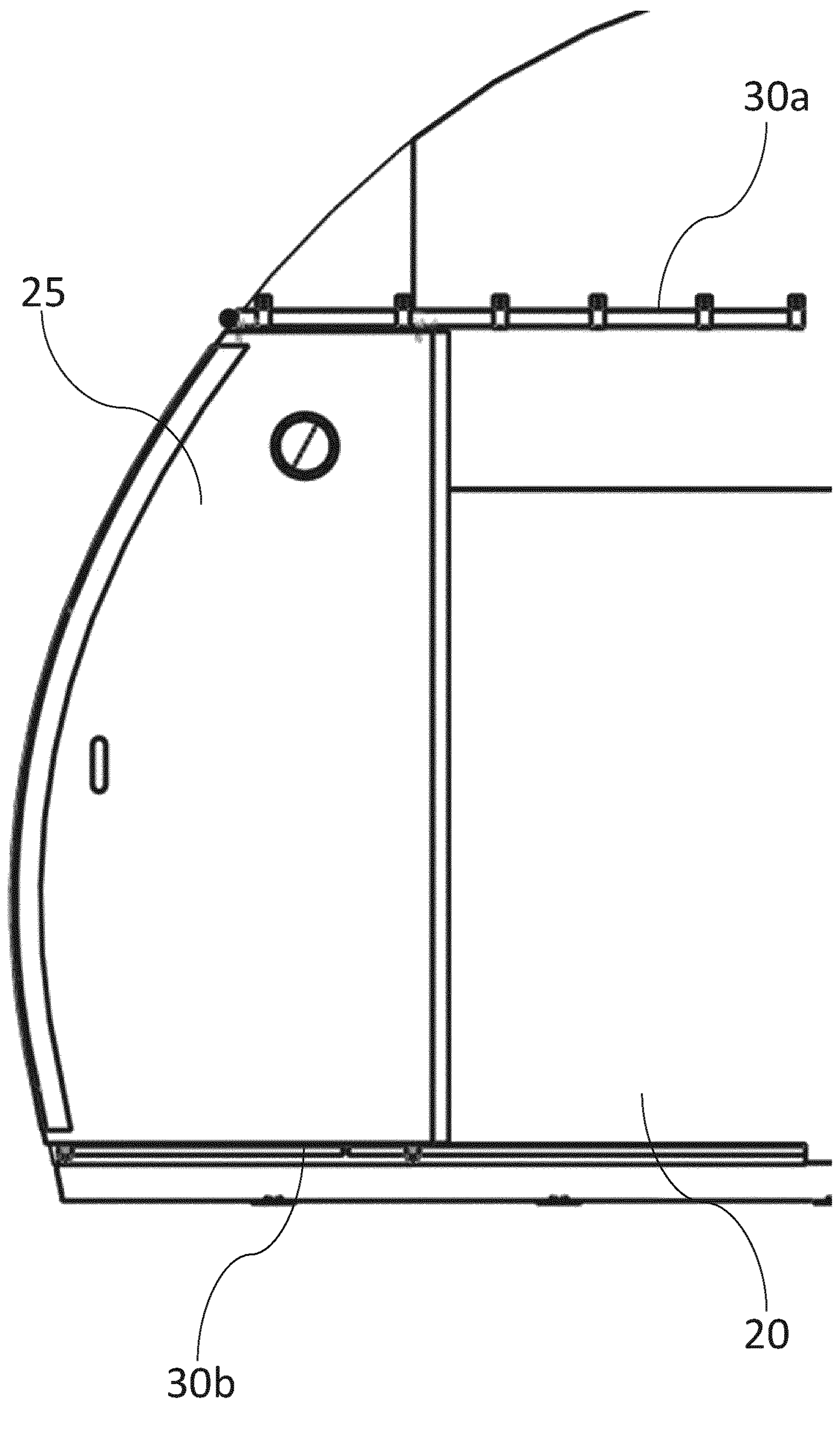
FIG. 4 shows the door in a closed position sealed in an opening of the barrier wall.

FIG. 4 shows the door 25 in a closed position in which the door 25 entirely covers the opening 21 with the door 25 sealed against the barrier wall 20 to prevent the passage of smoke across the barrier wall 20.

The allowable space for the door 25 and door mechanism (in this case a linear rail 30*a*, 30*b*) within the cargo section 4*c* is limited so as to maximise the available space for cargo containers 8 and other like items. For instance, the available space within the cargo section 4*c* may be less than 100 mm in the direction of the longitudinal axis 19 of the fuselage 4. A system that allows the door 25 to adequately seal over the opening 21 in the barrier wall 20 is therefore needed that minimises the space required, whilst ensuring the longevity of the seal.

Figure 5A:
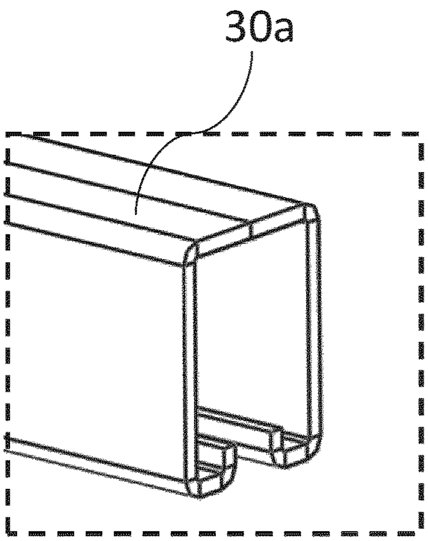
FIG. 5A shows an upper linear rail.
Figure 5B:
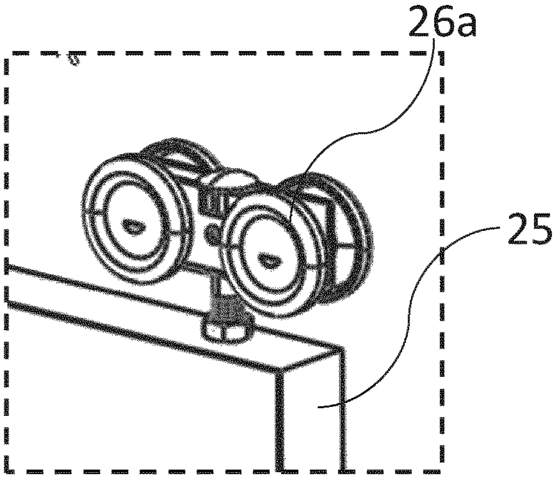
FIG. 5B shows a roller of the door configured to engage with the upper linear rail.
Figure 5C:
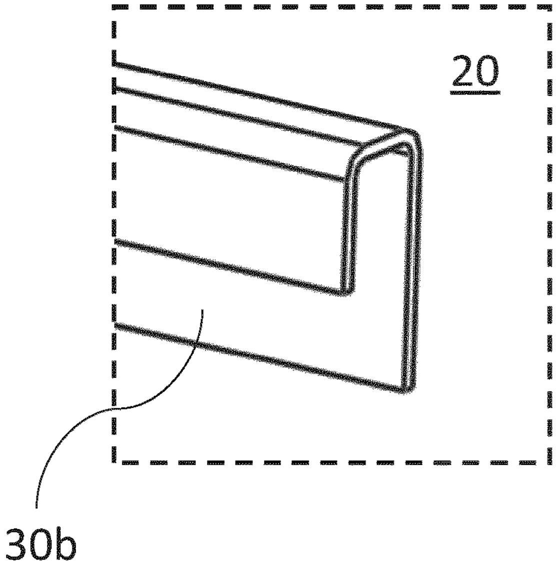
FIG. 5C shows a lower linear rail.
Figure 5D:
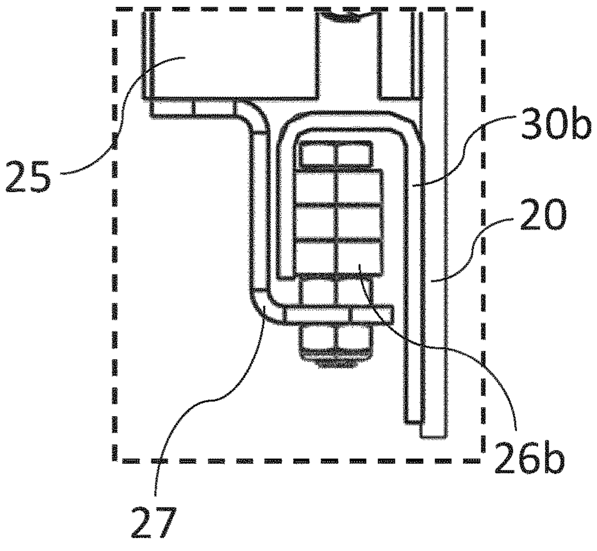
FIG. 5D shows a roller of the door engaged with the lower linear rail.

FIGS. 5A-5D show parts of the system for attaching the door 25 to the barrier wall 20 via the linear rails 30*a*, 30*b*. FIG. 5A shows the upper linear rail 30*a* that defines a linear path along which one or more followers 26*a*, such as a roller (See FIG. 5B), can travel linearly. The upper linear rail 30*a* is attached to the barrier wall 20 whilst the follower 26*a* is attached to the door 25. FIG. 5C shows the lower linear rail 30*b* attached to the barrier wall 20 and defining a linear path along which one or more followers 26*b* attached to the door 25 are moveable linearly. The follower 26*b* is attached to the door 25 via a bracket 27.

Figure 6:
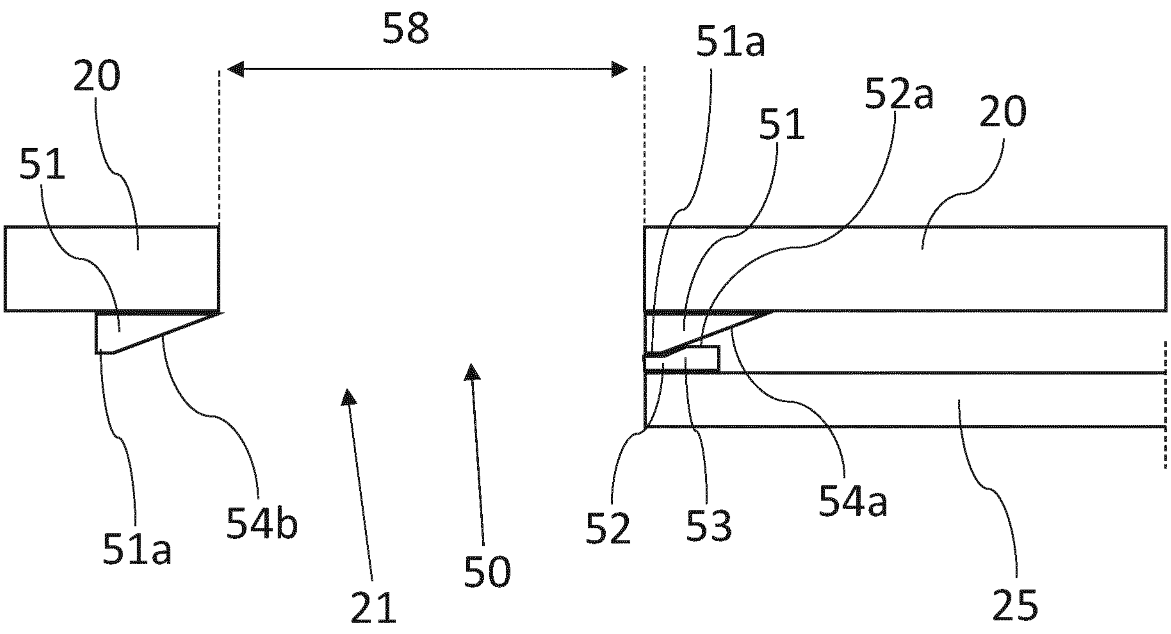
FIG. 6 shows a cross-sectional view of a first example of a seal assembly in a partially open position of the door.

FIG. 6 is a schematic cross-sectional view of the barrier wall 20 taken in a horizontal plane at a mid-point of the door 25 between upper and lower portions of the door 25 and shows a first example of a seal assembly 50 for sealing the door 25 against the barrier wall 20.

The seal assembly 50 includes a first member 51 attached to the barrier wall 20. The first member 51 extends around a perimeter of the opening 21. The seal assembly 50 includes a second member 52 attached to the door 25, with the second member 52 configured to engage with the first member 51 to form a seal around the perimeter of the opening 21. The first and/or second members 51, 52 may be at least partially formed from a low friction material, such as PTFE.

The second member 52 includes a seal element 53, such as a p-seal or o-seal. The seal element 53 may be formed of any suitably compressible material for forming an airtight seal, such as an elastomeric material. The seal element 53 may be coated with an anti-friction coating to minimise friction. The second member 52, and in particular the seal element 53, is configured to engage with the first member 51 to form a seal at respective seal surfaces 51*a*, 52*a* around the perimeter of the opening 21, i.e., a seal surface 51*a* of the first member 51 and a second seal surface 52*a* of the second member 52.

As the door 25 is moved from the open position to the closed position, the seal element 53 contacts the first member 51 and compresses so as to form the seal. To guide the seal element 53 against the first member 51 as it is compressed, a tapered edge 54*a* is provided at an outer, leading edge of the first member 51 (the leading edge being the first edge of the first member 51 that the seal element 53 contacts as the door 25 is moved from the open position to the closed position). In this way, the tapered edge 54*a* acts as a ramp for guiding the seal element 53 onto the first member 51 and into its compressed state. This can help reduce the wear and tear of the seal element 53, as well as reduce the force required to move the door 25 from the open position to the closed position. The tapered edge 54*a* may extend across the full vertical extent of the leading edge of the seal element 53 (between uppermost and lowermost points of the seal element 53) so as to be present at all edges at which the seal element 53 is initially compressed by the first member 51 (See FIG. 8).

The initial contact of the seal element 53 with the first member 51 can be particularly crucial, as the seal element 53 may catch or snag on a sharp edge so as to damage the seal element 53. The tapered edge 54*a* helps to minimise such abrupt contact, such that the tapered edge 54*a* can be particularly beneficial when the first member 51 is separate from the second member 52, i.e., not in direct contact, when the door 25 is in the closed position.

Figure 7:
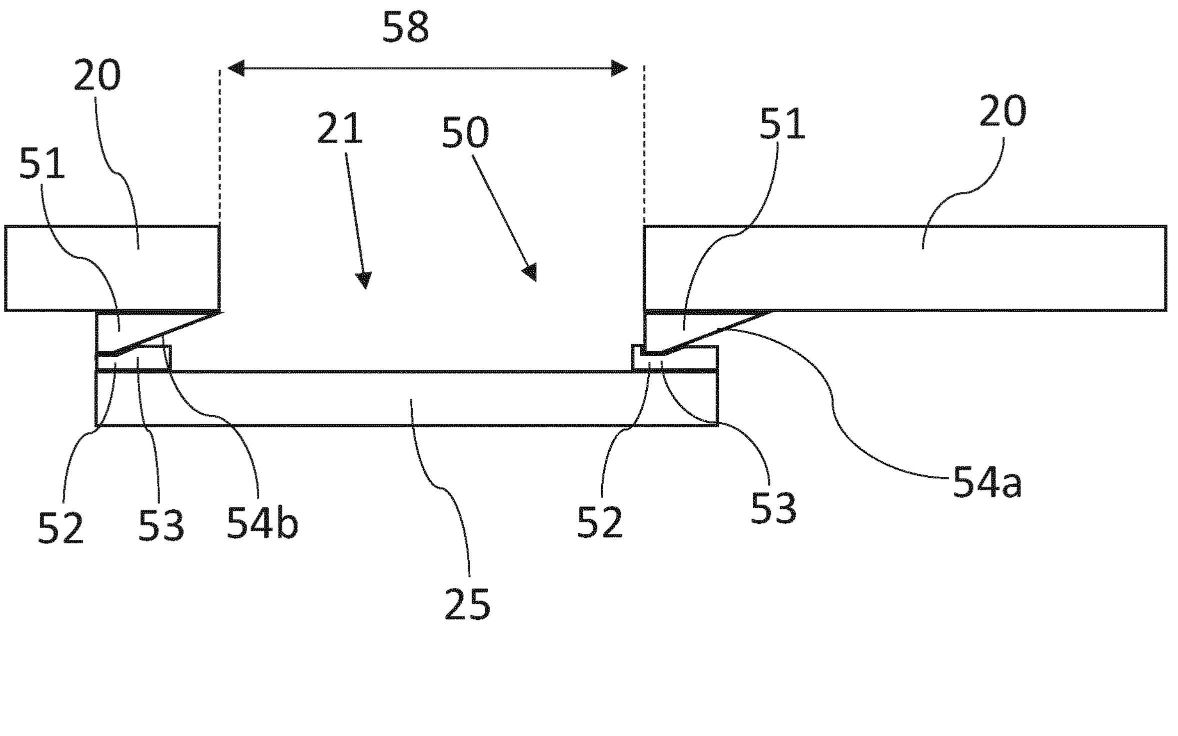
FIG. 7 shows a cross-sectional view of the seal assembly of FIG. 6 in a closed position of the door.

The seal assembly 50 may also include a second tapered edge 54*b*, as discussed in further detail in relation to FIG. 7 in which the door 25 is shown in the closed position.

It will be appreciated that the first member 51 defines an opening 58 that generally aligns with the opening 21 in the barrier wall 20 so as to maintain access through the barrier wall 20. As the mid-portion of the seal element 53, i.e. the portion between upper and lower portions of the seal element 53, enters this opening of the first member 51 in the partially open position, the seal element 53 will decompress. As such, as the door 25 moves further towards the closed position, the first member 51 includes a second tapered edge 54*b* at an inner edge of the first member 51 that the seal element 53, and in particular said mid-portion of the seal element 53, impacts. The second tapered edge 54*b* may be substantially the same as the first tapered edge 54*a* and function similarly so as to reduce wear and tear on the sealing element 53 as well as reduce the force required to move the door 25 to the closed position.

Each of the tapered edges 54*a*, 54*b* may define a planar tapered surface. The tapered edge 54*a* may be at an obtuse angle relative to the plane of the barrier wall 20. The obtuse angle may be less than 60 degrees, or less than 45 degrees.

Figure 8:
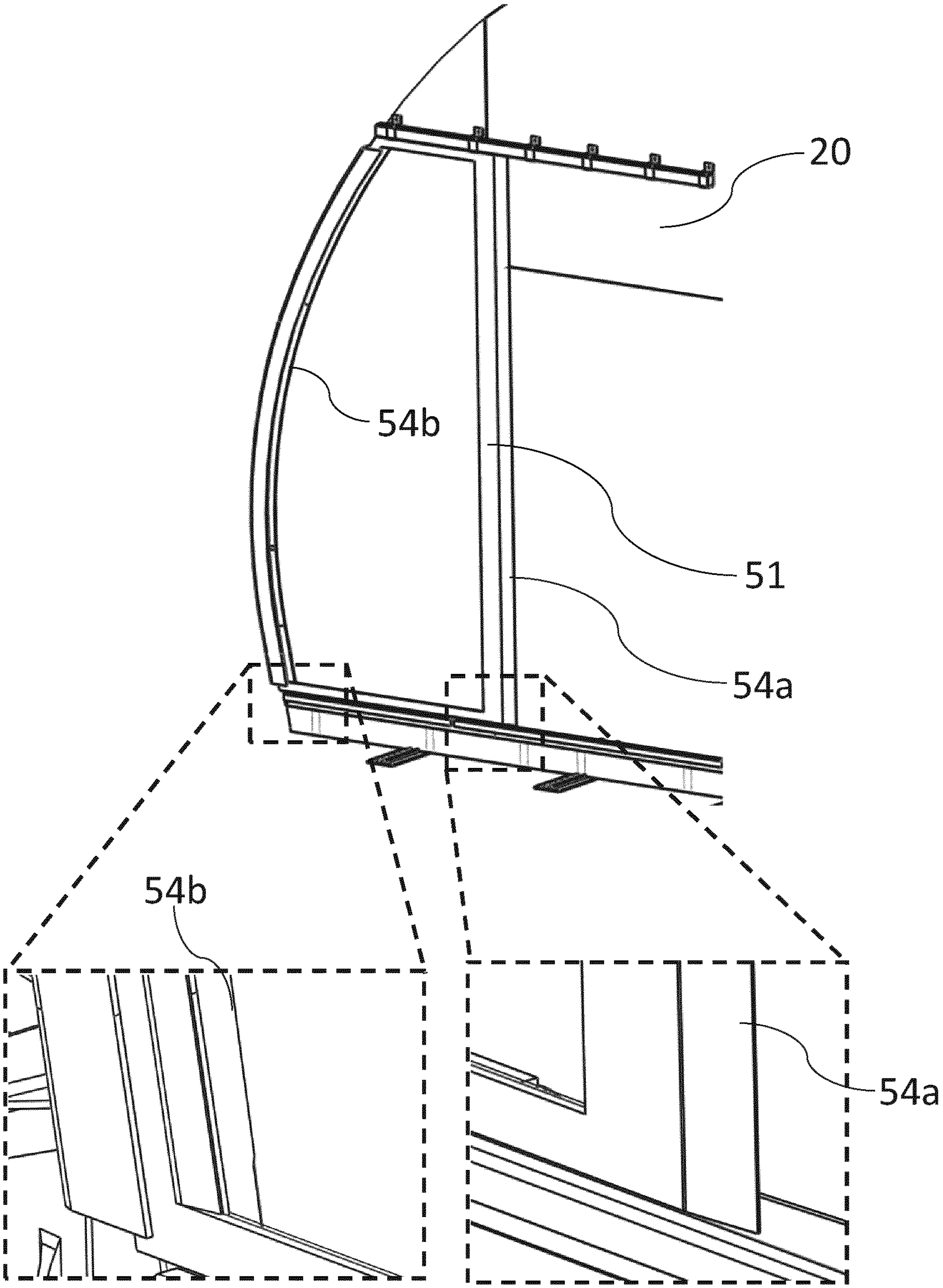
FIG. 8 shows a first member of the seal assembly attached to the barrier wall according to the first example.
Figure 9:
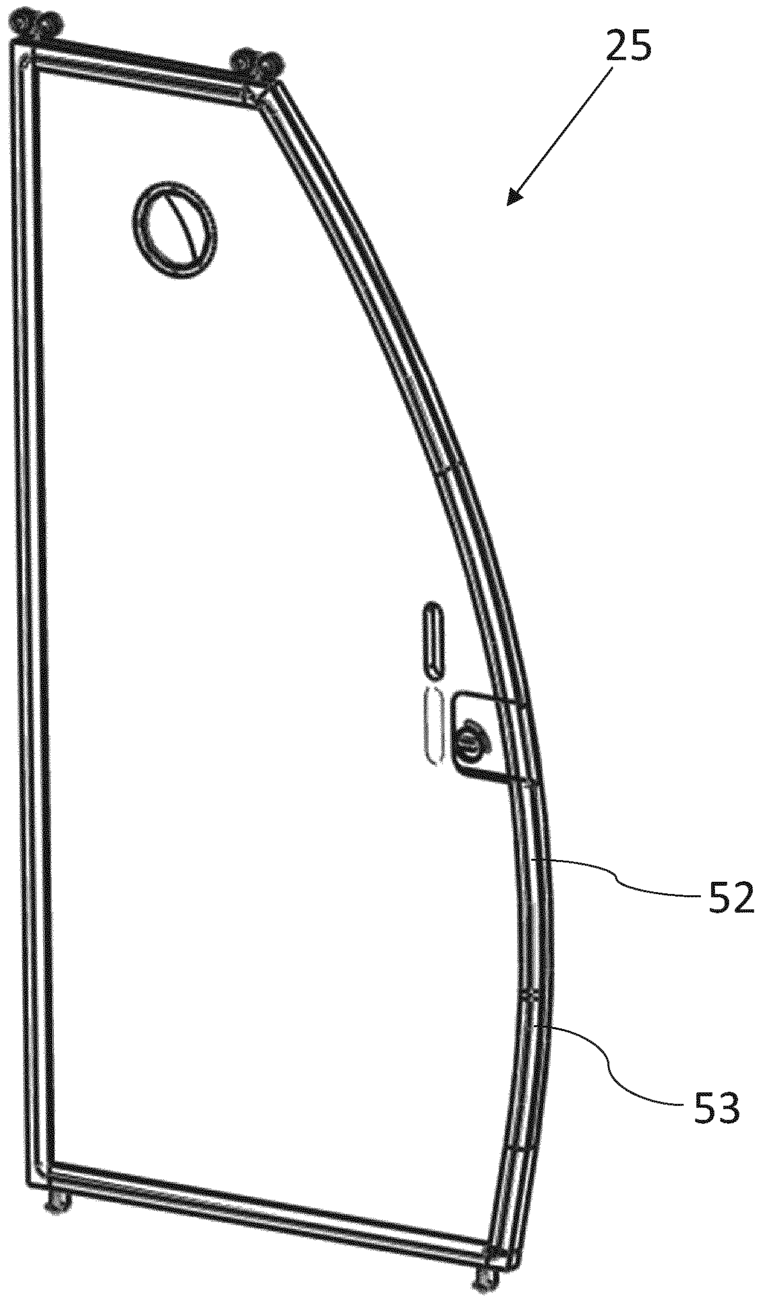
FIG. 9 shows a second member of the seal assembly attached to the door according to a first example.

FIG. 8 is a perspective view of the first member 51 of the seal assembly 50 attached to the barrier wall 20 showing the first tapered edge 54*a* at the outer edge of the first member 51 and the second tapered edge 54*b* at the inner edge of the first member 51, with the first tapered edge 54*a* extending across the full vertical extent of the outer edge and the second tapered edge 54*b* extending across the full vertical extent of the inner edge. FIG. 9 is a perspective view of the door 25, including a seal element 53 in the form of a p-seal attached to the door 25 that engages with the first member 51 to form the seal.

In the abovementioned examples, the seal element 53 is attached to the door 25, and in particular the second member 52. In alternative examples, the seal element 53 may be attached to the barrier wall 20, and in particular the first member 51, such that tapered edges 54*a*, 54*b* are formed on the second member 52.

The tapered edges 54*a*, 54*b* in the example shown in FIGS. 6 to 9 is configured to form a ramp onto which the seal element 53 is gradually compressed, thereby avoiding a sharp edge that results in sudden compression of the seal element 53 at a particular point during movement from the open position to the closed position. The seal surfaces 51*a*, 52*a* thereafter slide relative to each other until the door 25 is in the closed position.

Figure 10:
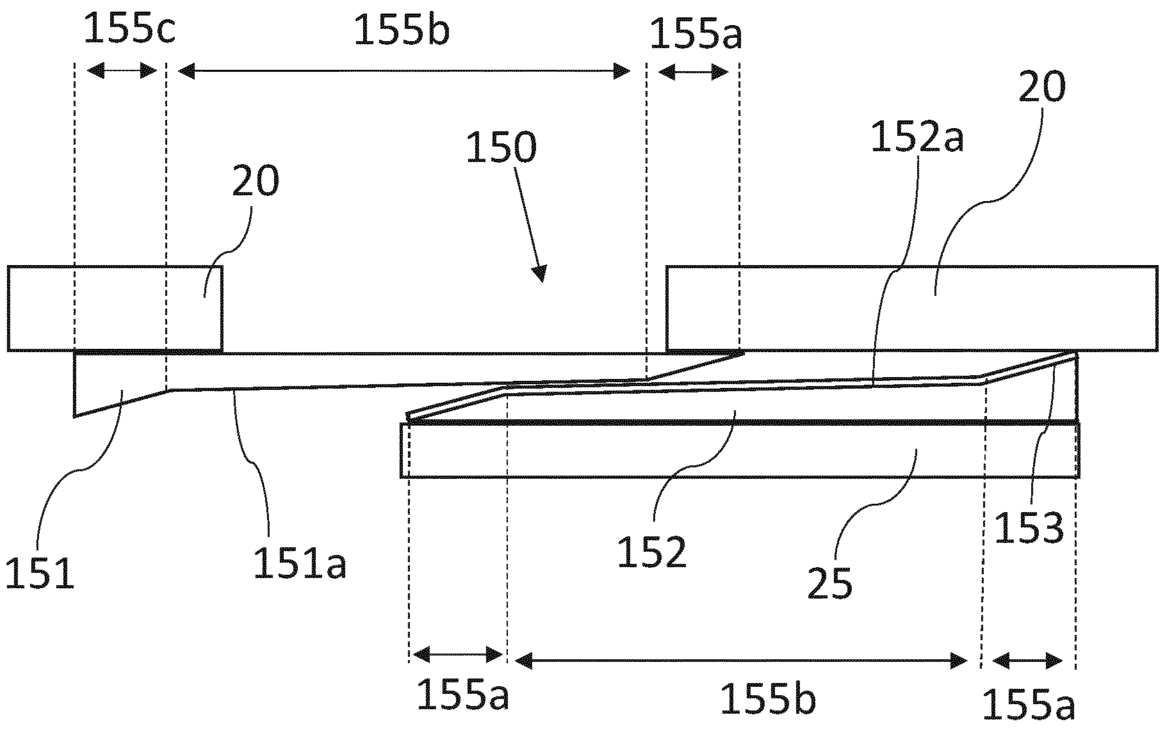
FIG. 10 shows a cross-sectional view of a second example of a seal assembly in a partially open position of the door.
Figure 11:
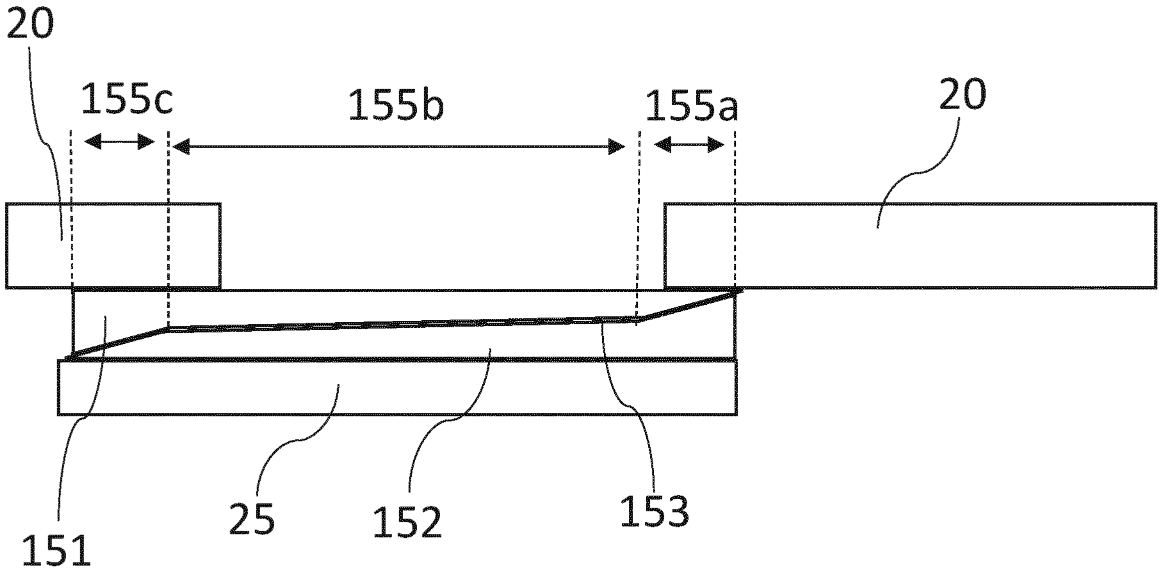
FIG. 11 shows a cross-sectional view of the seal assembly of FIG. 10 in a closed position of the door.
Figure 12:
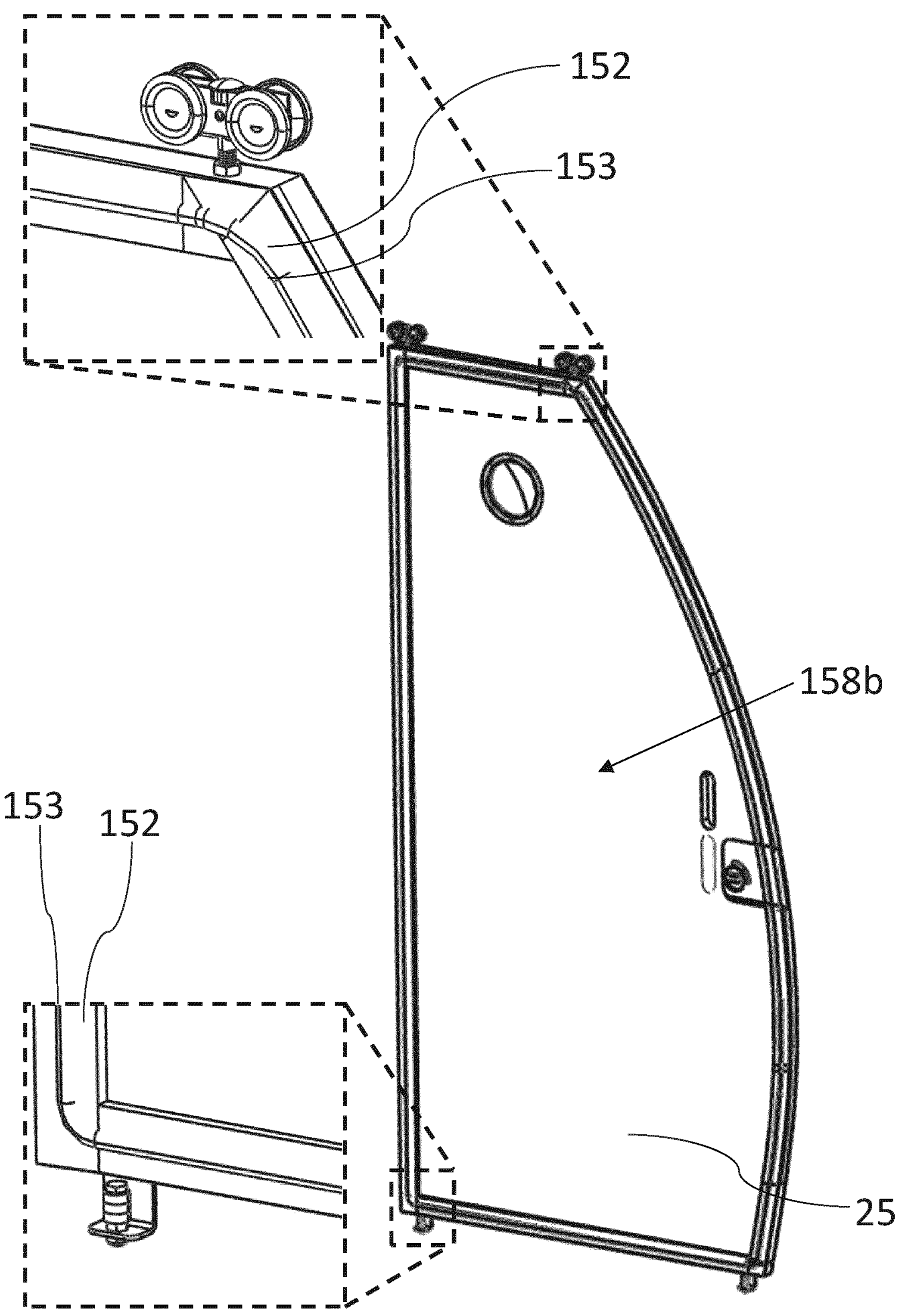
FIG. 12 shows a second member of the seal assembly attached to the door according to a second example.
Figure 13:
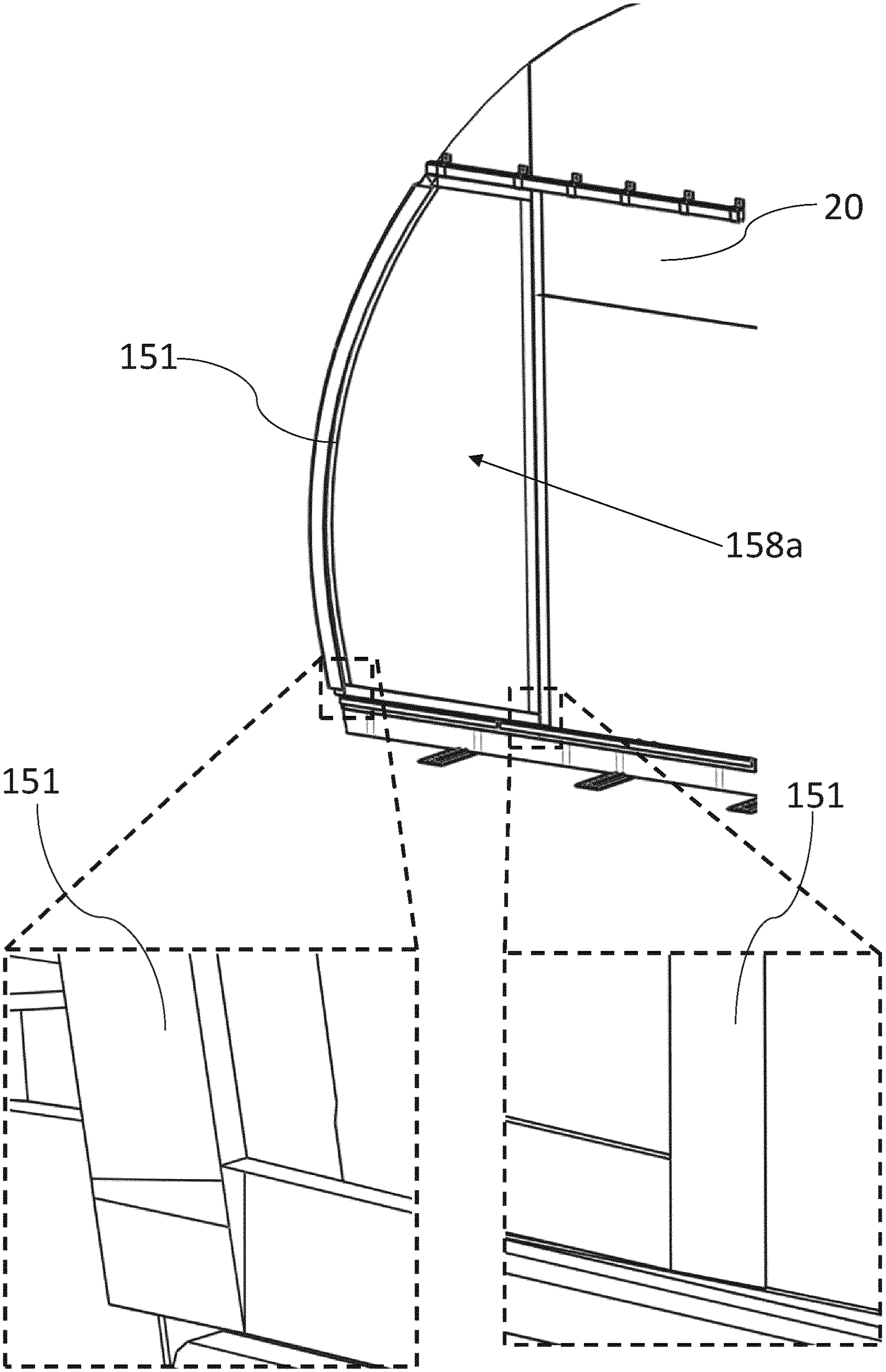
FIG. 13 shows a first member of the seal assembly attached to the barrier wall according to the second example.

FIGS. 10 to 13 show a second example of a seal assembly 150 for sealing the door 25 against the barrier wall 20, with FIG. 10 showing a cross-sectional view taken in a horizontal plane of the barrier wall 20, and FIGS. 11 & 12 showing perspective views of the door 25 and barrier wall 20, respectively.

The second example has a modified seal assembly 150 with respect to the seal assembly 50 of the first example, with like reference numerals used to denote like parts with the first example, and similar reference numerals but numbered in the 100 series used to denote similar parts with the first example.

The seal assembly 150 includes a first member 151 attached to the barrier wall 20 and extending around a perimeter of the opening 21 in the door 25. The seal assembly 150 includes a second member 152 attached to the door 25 and configured to engage with the first member 151 at respective seal surfaces 151*a*, 152*a* to form a seal around the perimeter of the opening 21.

In order to minimise the amount of frictional contact between the first and second members 151, 152 at the seal surfaces 151*a*, 152*a* that would result from sliding action during movement of the door 25, each of the seal surfaces 151*a*, 152*a* of the seal assembly 150 of the second example that form the seal are angled at an oblique angle relative to the direction of movement of the door 25 (i.e. angled relative to the linear path of the linear rail 30), with the oblique angle on the seal surface 151*a* of the first member 151 configured to compliment a respective oblique angle on the seal surface 152*a* of the second member 152 so that a tight seal is formed in the closed position. In other words, at any given position along the transverse extent of the door 25 (i.e. in a direction of movement of the door), the oblique angle of the seal surfaces 151*a*, 152*a* matches.

The obliquely angled portion of the seal surfaces 151*a*, 152*a* may extend across the entire width of the seal surfaces 151*a*, 152*a* (i.e. the extent of the seal surfaces 151*a*, 152*a* measured in the direction of movement of the door 25), other than across any openings 158*a*, 159*b* discussed in more detail below, and across the entire vertical extent of the seal surfaces 151*a*, 152*a*, such as shown in FIGS. 10 and 11. This ensures frictional contact between the seal surfaces 151*a*, 152*a* is minimised by avoiding the need for the seal surfaces 151*a*, 152*a* to slide relative to each other. In other words, contact between the seal surfaces 151*a*, 152*a* is delayed to a much later stage of the door 25 movement from the open position to the closed position.

Preferably the seal surfaces 151*a*, 152*a* are angled obliquely along their entire width-wise extent, as described above, although in alternative examples the obliquely angled portion of the seal surfaces 151*a*, 152*a* may extend across only a portion of their width-wise extent. For example, the obliquely angled portion of the seal surfaces 151*a*, 152*a* may extend across 50% or more of the width of the respective seal surfaces 151*a*, 152*a*.

In the example shown in FIGS. 10 to 13, the seal surfaces 151*a*, 152*a* are angled at different oblique angles across the width-wise extent of the seal surfaces 151*a*, 152*a*. Such an arrangement can provide a compromise that accounts for the limited available space in the cargo section 4*c* and the desire to minimise friction between the seal surfaces 151*a*, 152*a* as the door 25 is moved from the open position to the closed position.

Figure 14:
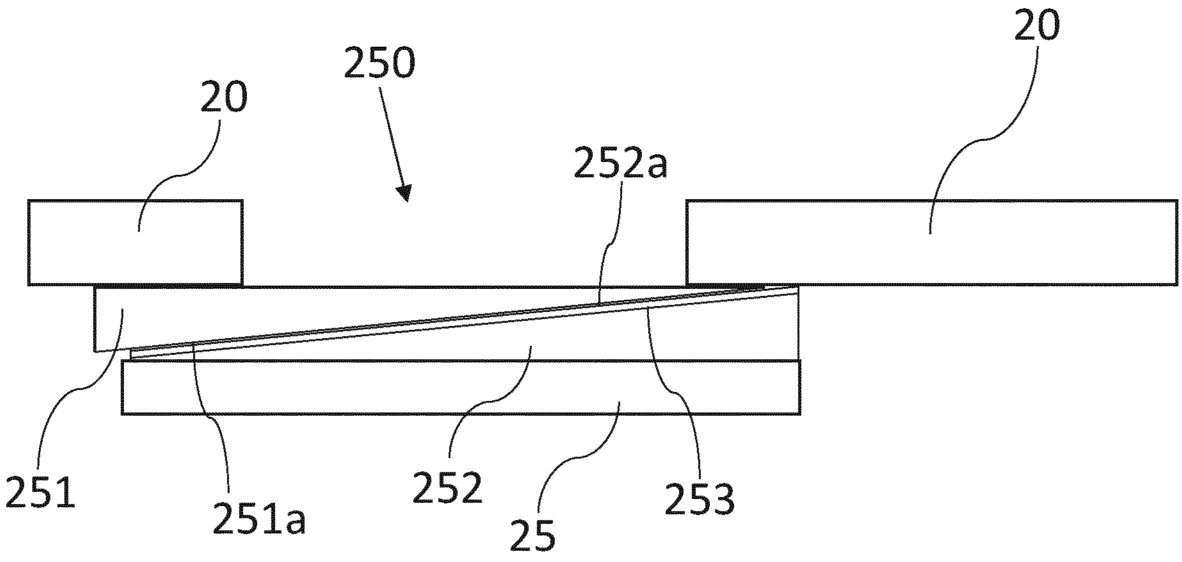
FIG. 14 shows a third example of a seal assembly.
Figure 15:
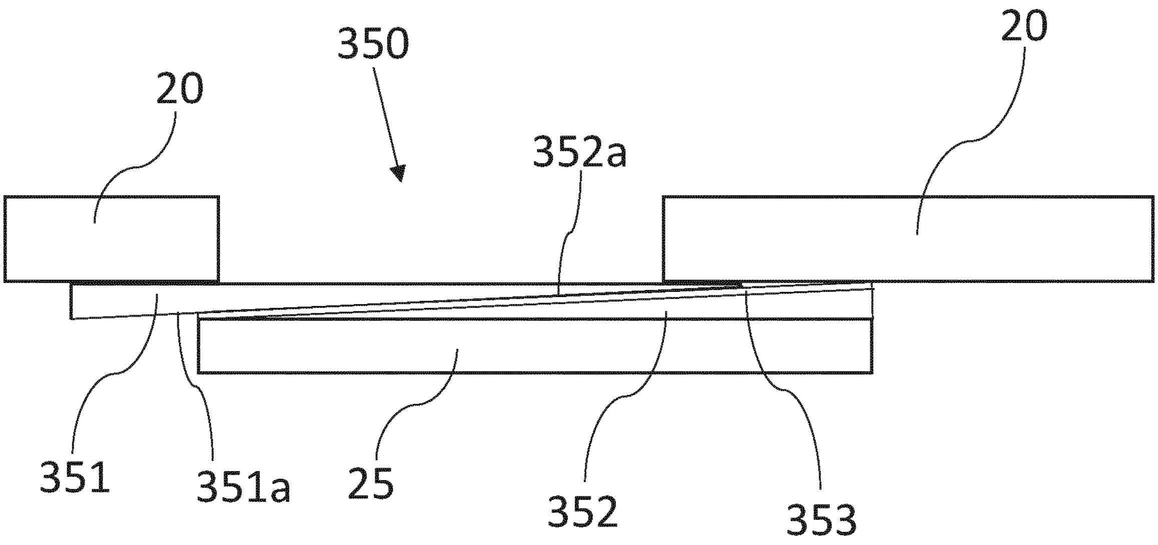
FIG. 15 shows a fourth example of a seal assembly.

A small oblique angle (i.e. a seal surface 151*a*, 152*a* having a shallow taper) results in the seal element 153 being compressed at an earlier stage of the door 25 movement from the open to the closed position, in comparison to a larger oblique angle. This is illustrated in the comparisons of FIGS. 14 and 15, in which FIG. 14 shows seal surfaces 251*a*, 252*a* angled at a smaller oblique angle than the seal surfaces 351*a*, 352*a* shown in FIG. 15. The Figures show the position of the door 25 at which the seal element 153, 253 first begins to compress as it is pushed against the first member 151. Even so, a relatively larger oblique angle (i.e. a seal surface 151*a*, 152*a* having a steep taper) results in the seal assembly 150 occupying a larger portion of the cargo section 4*c* as it extends further in the longitudinal direction of the fuselage 4.

The examples shown in FIGS. 10 to 13 reaches a compromise by providing regions of the seal surfaces 151*a*, 152*a* having different oblique angles. In particular, first and third seal surface regions 155*a*, 155*c* of the seal surfaces 151*a*, 152*a* are angled at a larger oblique angle than that of a second seal surface region 155*b* of the seal surfaces 151*a*, 152*a* located therebetween. Alternative examples may define respectively larger and smaller oblique angles of the seal surfaces 151*a*, 152*a* across any transverse regions, however the first and third seal surfaces 155*a*, 155*c* located at forward and rearward regions of the first and second members 151, 152 have a significantly larger vertical footprint. This is due to the seal surfaces 151*a*, 152*a* in these portions 155*a*, 155*c* being uninterrupted across the entire vertical extent of the first and second members 151, 152, whereas the seal surfaces 151*a*, 152*a* in the second seal surface region 155*b* are located only at upper and lower sections of the first and second members 151, 152, with respective openings 158*a*, 158*b* in the seal surfaces 151, 152 interrupting the upper and lower sections of the first and second members 151, 152.

As with the first example, it will be appreciated that in the second example the seal element 153 may be positioned on the first or second member 151, 152.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft fuselage comprising:

fore and aft sections of the aircraft fuselage, a barrier wall separating the fore and aft sections and the barrier wall defining an opening therebetween;

a door moveable in a straight line across the barrier wall between an open position in which the door is offset from the opening and a closed position in which the door covers the opening;

a seal assembly comprising a first member attached to the barrier wall and extending around a perimeter of the opening, and a second member attached to the door and configured to engage with the first member at respective seal surfaces to form a seal around the perimeter of the opening; and wherein one of the first and second members comprises a seal element configured to compress at a tapered edge of another of the first and second seal members as the door moves from the open position to the closed position.

2. The aircraft fuselage of claim 1, wherein, in the open position, the first member is separated from the second member.

3. The aircraft fuselage of claim 1, wherein the tapered edge extends across an entire vertical extent of the seal surfaces.

4. The aircraft fuselage of claim 1, wherein the tapered edge is located on an outer edge of the another of the first and second seal members.

5. The aircraft fuselage of claim 4, wherein the tapered edge is a first tapered edge, and wherein the another of the first and second seal members comprises a second tapered edge located on an inner edge of the another of the first and second seal members, the seal element configured to compress at the second tapered edge as the door moves from the open position to the closed position.

6. The aircraft fuselage of claim 1, wherein the first and/or second tapered edge has a planar tapered surface configured to engage with the seal element.

7. The aircraft fuselage of claim 1, wherein the first and/or second tapered edge has a taper angle of less than 60 degrees, or less than 45 degrees.

8. An aircraft fuselage comprising:

fore and aft sections of the aircraft fuselage, a barrier wall separating the fore and aft sections, the barrier wall defining an opening;

a door moveable in a straight line across the barrier wall that aligns with a direction of movement of the door between an open position in which the door is offset from the opening and a closed position in which the door covers the opening;

a seal assembly comprising a first member attached to the barrier wall and extending around a perimeter of the opening, and a second member attached to the door and configured to engage with the first member at respective seal surfaces to form a seal around the perimeter of the opening; and wherein at least a portion of the seal surfaces of the first and second members are angled at an oblique angle relative to a width of the seal surfaces, the width aligned with the direction of movement of the door.

9. The aircraft fuselage of claim 8, wherein the portion of the seal surfaces extends across at least 50% of the width of the respective seal surfaces.

10. The aircraft fuselage of claim 8, wherein the portion of the seal surfaces extends across an entire width of the seal surface.

11. The aircraft fuselage of claim 8, wherein the portion of each seal surface comprises at least two seal surface regions across the width of each of the seal surfaces, the seal surface regions of each seal surface angled at a different oblique angle.

12. The aircraft fuselage of claim 8, wherein the portion of each seal surface comprises first, second and third seal surface regions, the second seal surface region of each seal surface positioned between the first and third seal surface regions, the first and third seal surface regions uninterrupted across a vertical extent of the seal surfaces, and the second seal surface region interrupted across an opening of each seal surface, wherein the oblique angle of the first and third seal surface regions is greater angle than the oblique angle of the second seal surface region.

13. The aircraft fuselage of claim 8, wherein the at least a portion of the seal surfaces is angled at an oblique angle across an entire vertical extent of the seal surfaces.

14. The aircraft fuselage of claim 1, wherein the second member comprises the seal element.

15. The aircraft fuselage of claim 1, wherein the seal element is an elastomeric material, or wherein the seal element is a p-seal or o-seal.

16. The aircraft fuselage of claim 1, comprising a linear rail along which the door is arranged to move between the open position and the closed position.

17. The aircraft fuselage of claim 1, wherein the door is located on an aft side of the barrier wall.

18. The aircraft fuselage of claim 1, wherein an aft section of the fuselage is a cargo area comprising one or more containers.

19. The aircraft fuselage of claim 1, wherein the barrier wall is attached to a fuselage frame.

20. An aircraft comprising the aircraft fuselage of claim 1.

* * * * *